United States Patent [19]

Moriya et al.

[11] 4,194,914

[45] Mar. 25, 1980

[54] HEAT-RESISTING CERAMIC FIBERS AND METHOD FOR MANUFACTURE THEREOF

[75] Inventors: Yoshiro Moriya, Kawanishi; Kazuhito Ikai, Ohgaki; Makoto Tanaka, Gifu, all of Japan

[73] Assignees: Agency of Industrial Science & Technology, Ministry of International Trade & Industry, Tokyo; Ibigawa Electric Industry Ltd., Gifu, both of Japan

[21] Appl. No.: 881,743

[22] Filed: Feb. 27, 1978

[30] Foreign Application Priority Data

Mar. 1, 1977 [JP] Japan .................................. 52/22508

[51] Int. Cl.² .............................................. C09K 3/28
[52] U.S. Cl. .................................. 106/18.14; 65/3 R; 106/18.16; 106/50; 162/152; 162/156; 427/215; 427/380; 428/389; 428/392
[58] Field of Search .................. 162/3, 9, 80, 152, 153, 162/156; 106/50, 15FP, 18.14, 18.16; 427/215, 380, 383 B; 428/379, 389, 392; 65/3 R, 3 B, 30 E

[56] References Cited

U.S. PATENT DOCUMENTS

| 2,690,100 | 9/1954 | McGarvey | 162/152 |
| 3,535,150 | 10/1970 | Lipsett | 162/153 |
| 3,957,571 | 5/1976 | Bodycomb | 427/215 |
| 4,005,232 | 1/1977 | Colebourne et al. | 428/389 |

Primary Examiner—Lorenzo B. Hayes
Attorney, Agent, or Firm—Oblon, Fisher, Spivak, McClelland & Maier

[57] ABSTRACT

Highly heat-resisting ceramic fibers are manufactured either by simply coating the surface of ceramic fibers with at least one phosphorus compound or by further subjecting the resultant coated ceramic fibers to a heat treatment. The ceramic fibers having the surface coated with said phosphorus compound or the ceramic fibers having the phosphorus compound contained therein at a gradually decreasing concentration in the direction of increasing depth from the surface which are manufactured by the aforesaid method are capable of high resistance to heat.

20 Claims, 11 Drawing Figures

Fig_1

Fig_2

Fig_3

Fig_8

Fig_9

HEAT-RESISTING CERAMIC FIBERS AND METHOD FOR MANUFACTURE THEREOF

BACKGROUND OF THE INVENTION

This invention relates to highly heat-resisting ceramic fibers and to a method for the manufacture thereof.

The term "ceramic fiber" as used herein refers generally to all ceramic fibers produced by fusing refractory materials composed preponderantly of silica and alumina and converting the fused material into fibers by blowing a jet flow of air against the fused material or subjecting the fused material to centrifugal spinning.

Heretofore ceramic fibers have been claimed to offer resistance to heat generally up to a critical point of about 1260° C. (2300° F.) and, therefore, have been customarily used at temperatures below a limit of about 1000° C. The reason for this limit on working temperature is that a ceramic fiber, if used at temperatures exceeding 1000° C., undergoes conspicuous thermal degradation which eventually reaches a point where the fibers become brittle and disintegrate in what is called the "powdering" phenomenon. End-use products made of such ceramic fibers include blankets obtained by forming bulk fibers (aggregates of short fibers) into the shape of sheets, felts obtained by blending bulk fibers with a small amount of a binder and forming the resultant mix in a desired shape, boards obtained by molding bulk fibers in the shape of plates and various other shaped articles. At temperatures above said limit, these products undergo heavy thermal contraction and lose their original shape.

For the purpose of improving the heat-resisting property of ceramic fibers, methods like those described below have been suggested.

(1) The method directed to elevating the critical point by increasing the alumina content of the refractory material and producing high-alumina ceramic fibers.

(2) The method aiming to effect desired elevation of the critical point by adding to the refractory material a small amount of at least one oxide selected from the group consisting of chromium oxide, zirconium oxide, etc.

(3) The method comprising the steps of converting a solution containing preponderantly the compounds of aluminum and/or zirconium into fibers and burning the fibers to give rise to polycrystalline ceramic fibers.

These methods suffer from a common disadvantage that the refractory materials used therefor have rather high melting points compared with the refractory materials for ordinary ceramic fibers and the fused refractory materials are more inclined toward crystallization and cannot easily be converted into fibers. Moreover, in method (3) the raw materials are very expensive so that the products of this method become impractically high in price.

Thus, only a small quantity of products are actually manufactured by these methods and the uses found therefor are limited.

The present invention is characterized by using one or more phosphorus compounds as described in detail hereinafter.

Ceramic fibers are composed preponderantly of alumina and silica. Thus ceramic fibers have one thing in common with glass, i.e. both ceramic fibers and glass have silica as their principal component. Methods have been suggested for improving the thermal and/or mechanical properties of glass by use of a phosphorus compound. One such method is disclosed on page 197 of Susumu Kawamura's "Glass Handbook" published by Asakura Shoten in 1975. The essence of this method resides in having a small amount of a phosphorus compound incorporated in advance in the raw material prepared for the production of glass. According to this method, the added phosphorus compound functions as a sort of nucleating agent and aids in producing so called glass ceramics excelling in heat-resisting property and mechanical impact resistance. Another method is disclosed in J. P. Poole & H. C. Snyder's "Glass Technology", 16, 109–113 (1975). This method aims to enhance the thermal and/or mechanical strength of the glass by means of ion exchange, for example. Specifically, this method comprises immersing a given glass article in the melt of a phosphate of potassium for thereby allowing potassium ions of a greater ionic radius present in the melt to undergo the phenomenon of ion exchange with sodium ions of a smaller ionic radius present in the glass. In consequence of this ion exchange, a strong compressed layer is formed on the surface of glass and the thermal and mechanical strength of the glass is enhanced. In this case, the phosphate plays the role of retaining the thermal stability of the melt and has nothing whatever to do with the improvement in the properties of glass itself.

One object of the present invention is to provide highly heat-resisting ceramic fibers.

Another object of the present invention is to provide a method for the manufacture of highly heat-resisting ceramic fibers from ordinary ceramic fibers.

SUMMARY OF THE INVENTION

To accomplish the objects described above according to the present invention, there are provided highly heat-resisting ceramic fibers which comprise ceramic fibers and a coat of one or more phosphorus compounds deposited on the surface of individual threads of said ceramic fibers. When the highly heat-resisting ceramic fibers are heated, their thermal contraction under load at 1400° C. is less than 10%. The amount of the phosphorus compound which coats the surface of individual ceramic fibers is desired to fall in the range of from 0.5 to 10% by weight, computed as $P_2O_5$. The thermal contraction under load at 1400° C. is particularly less than 5% when the content of phosphorus compound is limited to the range of from 1 to 6% by weight as $P_2O_5$. Said highly heat-resisting ceramic fibers are manufactured by immersing ordinary ceramic fibers in a solution containing the phosphorus compound, spraying said solution upon said fibers or directly applying the solution to the fibers.

Further, the highly heat-resisting ceramic fibers of the present invention embrace those ceramic fibers which contain said phosphorus compound in their individual threads at a gradually decreasing concentration in the direction of increasing depth from their surface and those ceramic fibers whose individual threads are composed of crystals of substantially uniform diameter, the maximum thereof being 500 Å. The highly heat-resisting ceramic fibers of such constructions are produced by coating the surface of individual threads of ceramic fibers with said phosphorus compound, then drying the coated ceramic fibers when necessary, and thereafter heating the coated ceramic fibers at a temperature of at least about 600° C. The amount of the phosphorus compound thus coating the ceramic fibers is desired to fall in the range of from 0.5 to 10% by weight. The heat-resisting property the ceramic fibers exhibit is particularly high when the amount of the phosphorus compound is in the range of from 1 to 10% by weight.

DETAILED DESCRIPTION OF THE INVENTION

The prerequisites for prevention of the thermal degradation in ceramic fibers are suppression of their thermal contraction and preclusion of their powdering due to cracking and disintegration. The inventors studied the problem from various angles with a view to fulfilling the prerequisites.

Through investigation into the relation between the fibers' state of crystallization and their heat-resisting capacity during their use at elevated temperatures, the inventors have ascertained that the size of crystals making up the fibers and the state of their distribution within the fibers are interrelated with the thermal contraction of fibers. To be more specific, they have learned that crystals are formed in ceramic fibers upon heating at elevated temperatures and that the smaller these crystals are, the more uniform they are in size and the tighter they are packed together, the greater is the resistance of the ceramic fibers to heat that is to say the greater is their freedom from thermal degradation, phenomenon of powdering and thermal contraction.

After additional studies, the inventors have further ascertained that (1) ceramic fibers having the surface of their individual threads coated with a phosphorus compound and (2) ceramic fibers having a phosphorus compound contained in their individual threads in a gradually decreasing concentration in the direction of increasing depth from the surface, the surface layer or surface-to-interior layer of the individual threads of which is made up of crystals of diameters substantially uniform and not larger than the maximum of 500 Å, satisfy the prerequisite for highly heat-resisting ceramic fibers, that as regards the degree of the heat-resisting capacities of these ceramic fibers, their thermal contractions under load at 1400° C. are less than 10% where the phosphorus compound contents in the ceramic fibers are in the range of from 0.5 to 10% by weight computed as $P_2O_5$ based on the fibers, and that the fibers' heat-resisting capacities are particularly high and their thermal contractions fall below 5% where the phosphorus compound contents are in the range of from 1 to 6% by weight computed as $P_2O_5$ based on the ceramic fibers. The weight ratio between the phosphorus compound and the ceramic fibers in such highly heat-resisting ceramic fibers is substantially the same both when raw ceramic fibers preparatorily coated with the phosphorus compound come to acquire a highly heat-resisting structure and exhibit a heat-resisting property as the result of being subsequently heated in actual use and when the ceramic fibers coated with phosphorus compound are given the highly heat-resisting structure by being subjected to heat treatment prior to use.

Now, the present invention will be described in full detail.

When ceramic fibers are produced from a molten mixture of raw materials, the molten mixture is set by sudden cooling to produce ceramic fibers. In the course of this procedure, strain develops in the fibers. When these fibers are heated, the strain developed in the fibers by the sudden cooling begins to release at temperatures around 900° C., causing the ceramic fibers to undergo primary thermal contraction. As the temperature further rises and reaches the neighborhood of 1000° C., mullite ($3Al_2O_3.2SiO_2$) begins to crystallize out from the vitreous phase and said primary thermal contraction is brought to termination. The amount of mullite phase increases with the increasing temperature. As the temperature reaches about 1200° C., the amount of the mullite phase increases to about 90 to 100% of the theoretical amount calculated from the amount of $Al_2O_3$ contained. The remaining vitreous phase becomes increasingly silica rich with the gradual decrease of $Al_2O_3$. The crystallization of cristobalite ($SiO_2$) from the silica rich vitreous phase leads to heavy shrinkage, namely secondary thermal contraction. The secondary thermal contraction increases with the increasing amount of cristobalite ($SiO_2$) thus crystallized from the vitreous phase. As the thermal contraction of ceramic fibers gains in degree, the fibers are brittled because of the growth of crystals and become increasingly more susceptible to powdering.

Since the thermal degradation of ceramic fibers is closely related to the crystallization of mullite and cristobalite as described above, control of the size and distribution of the educed crystals is an important factor in reducing thermal contraction and powdering during heating at elevated temperatures.

This invention aims to effect the proper control of the size of crystals and the state of their distribution by introducing one or more phosphorus compounds or phosphorous components to ceramic fibers after said fibers have been produced from the molten mixture of raw materials.

Figure 1:
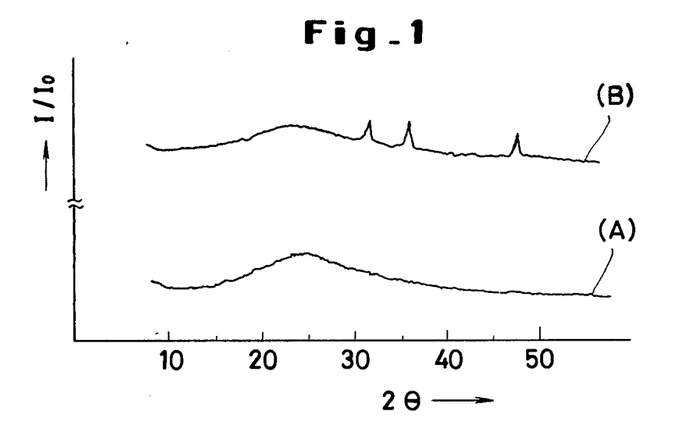
FIG. 1 and FIG. 2 are X-ray diffraction diagrams obtained respectively of conventional ceramic fibers and highly heat-resisting ceramic fibers of the present invention.

FIG. 1 is an X-ray diffraction diagram showing the results obtained by heating to 600° C. the conventional ceramic fibers made of 47.9% of silica and 51.3% of alumina and the ceramic fibers of this invention made of silica and alumina in the same composition ratio and further coated with 2% by weight (as $P_2O_5$) of $(NH_4)_2HPO_4$ as a phosphorus compound.

Comparison of the diffraction curves (A) and (B) reveals that when the ceramic fibers of the present invention [diffraction curve (B)] are heated to a temperature of about 600° C., there ensues eduction of crystals believed to contain phosphorus (hereinafter referred to as "U crystals") which are never observed to occur in the conventional ceramic fibers [diffraction curve (A)]. As the eduction of U crystals proceeds, the strain of the vitreous component is partially or wholly released. For this reason, the primary thermal contraction which is generally observed to occur around 900° C. in the conventional untreated ceramic fibers is greatly decreased. Furthermore, the U crystals function as nuclei for the crystallization of mullite around 1000° C. and for the crystallization of cristobalite around or over 1200° C. and they function to cause said crystals to be educed in fine sizes and in tightly packed states.

Figure 2:
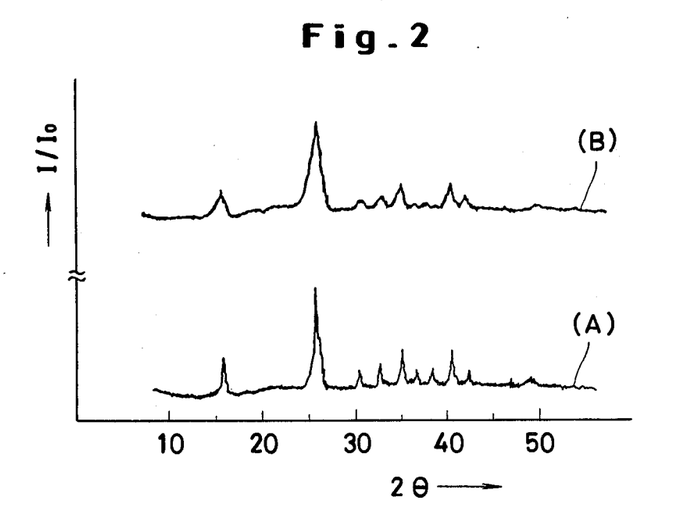
Figure 3:
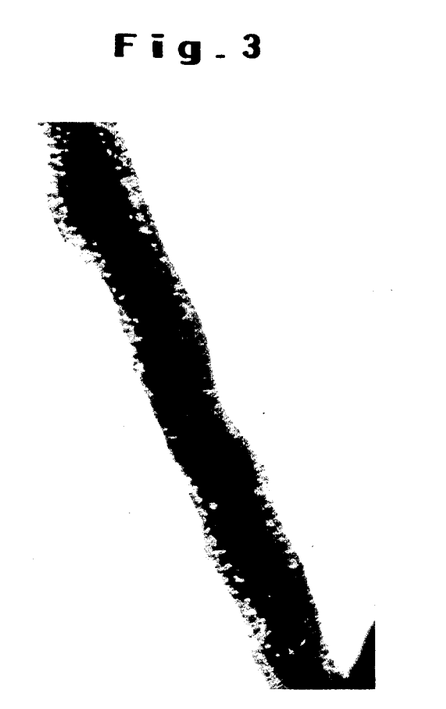
FIG. 3 is a transmission electron micrograph (magnification: 150000) taken of highly heat-resisting ceramic fiber of the present invention.

FIG. 2 is an X-ray diffraction diagram illustrating the results obtained, after heating to 1200° C., of the same sample fibers as those which gave the diffraction curves of FIG. 1. Operation of Scherrer Formula [P. Scherrer Gottinger Nachrichten, 2, 98 (1918)] for the calculation of average particle size of crystals using, as variables, the widths of the diffraction peak at $2\theta=35.5°$ in the diffraction curve (B) of FIG. 1 and of the diffraction peaks of mullite crystals at $2\theta=40.9°$ in the diffraction curve (A) obtained of the conventional ceramic fibers and in the diffraction curve (B) obtained of the ceramic fibers of the present invention as shown in FIG. 2 reveals that the average particle size is about 80 to 100 Å in the U crystals, about 800 to 1000 Å in the mullite crystals corresponding to the diffraction curve (A) of FIG. 2 and 250 to 300 Å in the mullite crystals corresponding to the diffraction curve (B) of FIG. 2. This indicates that, in the ceramic fibers of the present invention, the crystals educed by heating are extremely small. The condition in which such fine crystals are educed is clearly shown by the transmission electron micrograph of FIG. 3 which was taken of highly heat-resisting ceramic fibers produced by heating to 1300° C. those ceramic fibers made of silica, alumina and phosphorus compound in the same composition ratio as the highly heat-resisting ceramic fibers which gave the results of FIG. 1. Judging from the magnification of the micrograph, the size of educed crystals is about 250 to 300 Å, a value satisfactorily agreeing with the value calculated from the X-ray diffraction peak as mentioned above. What should be particularly noted about the photomicrograph is the fact that the crystals educed are not only small but are substantially uniform and distributed in a tightly packed state close to the surface of the individual threads of the fibers. The distribution of crystals just mentioned is never observed in the conventional ceramic fibers in which crystals having a size of the order of 800 to 1000 Å are educed.

Now, from the standpoint of thermal stability, the change of thermal contraction under load of ceramic fibers along the course of heating time can be expressed generally by using either or both of temperature and time of heating. In the ceramic fibers of the present invention, however, the time-course thermal contraction under load is extremely small even at 1200° C., as shown afterward in the Examples, compared with the conventional ceramic fibers. Owing to the fact that the thermal contraction is small, the ceramic fibers of this invention are neither embrittled nor powdered even when they are exposed to high temperatures above 1200° C. for a long time. As is evident from the foregoing description, the major factor which enables the ceramic fibers of this invention to show a small thermal contraction under load, yet retain flexibility at elevated temperatures and enjoy high strength as compared with the conventional ceramic fibers resides in the fact that the crystals which are educed in the ceramic fibers of the present invention are very small and are in a tightly packed state. The eduction of such crystals has been materialized for the first time by the present inventors.

This invention embraces those ceramic fibers which have a phosphorus compound kept in a state merely adhering to the surface of their individual threads. These ceramic fibers are recognized as belonging among the highly heat-resisting ceramic fibers aimed at by this invention, because in applications involving use of temperatures above 600° C., while the fibers are being heated up to the level of 600° C. or so, the phosphorus compound adhering to the surface of individual threads of ceramic fibers is partly or wholly caused to react with the fibers and consequently constitute part of the fibers.

The highly heat-resisting ceramic fibers contemplated by the present invention can be produced, as already described above, from ceramic fibers of varying compositions. Alumino-silicate fibers containing silica and alumina in substantially equal amounts, high-alumina fibers containing 50 to 70% by weight of alumina and 50 to 30% by weight of silica and three-component fibers consisting mainly of silica and alumina and additionally incorporating a small amount of an oxide of chromium or zirconium are examples. Other ceramic fibers of varying compositions can be used for the production of the ceramic fibers of this invention insofar as satisfy the definition of "ceramic fibers" as set forth above and meet the sole prerequisite that the silica content and the alumina content both should exceed the lower limits of 25% by weight. Ceramic fibers which fail to contain silica and alumina beyond their respective limits of 25% by weight cannot produce the highly heat-resisting ceramic fibers which meet the standard of this invention.

The method by which the highly heat-resisting ceramic fibers of this invention are produced will be described. Ceramic fibers, as a raw material, are soaked in a solution containing a phosphorus compound such as, for example, a solution of a phosphoric acid like orthophosphoric acid, pyrophosphoric acid, metaphosphoric acid, triphosphoric acid or tetraphosphoric acid or a solution of a phosphate like $MH_2PO_4$, $M_2HPO_4$ or $M_3PO_4$ (M denoting an alkali and/or ammonium), especially in an aqueous ammonium phosphate solution so as to have the phosphorus compound adhere to the surface of individual threads. Alternatively, desired adhesion of the phosphorus compound to the surface of individual fibers can be accomplished by applying said solution of phosphoric acid or phosphate to the surface of ceramic fibers by means of a spray or depositing the solution on the surface of individual fibers with the aid of a flow coater, for example.

According to the present invention, the phosphorus compound can be applied to the surface of ceramic fibers by a very simple, convenient method as described above. Thus, the same treatment can be effected as easily on ceramic fibers shaped in the form of woven blankets, in the form of felts and in some other forms as on bulky fibers. Subsequent to the adhesion of the phosphorus compound to the surface of fibers, the fibers are drained when necessary, then gradually dried in a stream of air or forcibly dried by heating at a temperature above the level or about 600° C., and thereafter subjected to a heat treatment. By the procedure described above, the ceramic fibers are converted in a short span of time into highly heat-resisting ceramic fibers ready for use. The heat treatment is desired to be carried out at temperatures falling in the range of from about 600° to 1200° C. In consequence of the treatments described above, the phosphorus compound is caused to react with the ceramic fibers and the ceramic fibers are converted into phosphorus compound-containing ceramic fibers. In the individual threads of ceramic fibers, therefore, the phosphorus compound will be contained in a gradually decreasing concentration in the direction of increasing depth from the surface. Further, the surface layer in the individual threads of ceramic fibers will be formed of very fine crystals having substantially equal diameters not exceeding 500 Å and distributed intimately in a tightly packed state. If said heat treatment is carried out at a temperature below 600° C., the phosphorus compound is not caused to react amply with the surface layer of individual threads. If the ceramic fibers having adhered phosphorus compound are rapidly heated to a temperature above 1200° C., there is a fair possibility that the expected control of the size and distribution of the crystals educed in the individual threads will not be fully attained. In the present invention, the phosphorus compound is added to the ceramic fibers in the amount of from 0.5 to 10% by weight, computed as phosphorus pentoxide ($P_2O_5$) based on the ceramic fibers. These limits to the amount of phosphorus compound are fixed for the following reasons: If the amount is less than 0.5% by weight, the effect of the phosphorus compound in preventing thermal contraction in the fibers becomes too small. If it is greater than 10% by weight, the fibers lack flexibility and tend to undergo powdering, although the phosphorus compound proves quite effective in protecting the fibers against thermal contraction. Preferably the amount falls in the range of from 1 to 6% by weight. If the phosphorus compound is used in this preferred range, the improvement of heat-resisting property becomes especially conspicuous. The thermal contraction under load which constitutes an important criterion for the degree of heat-resisting property has a maximum of 10% when the amount of phosphorus compound is 1% and a maximum of 5% when the amount of phosphorus compound is 6% at 1400° C.

By first causing the phosphorus compound to adhere to the surface of conventional ceramic fibers and thereafter heating the fibers gradually (at a temperature increasing rate of 1° to 10° C./min., for example) as described above, the inventors have succeeded in reducing the thermal contraction of fibers even at a highly elevated temperature of 1400° C. to the order of 2 to 3%, at times to even below 1%. These are levels never attained by conventional ceramic fibers. Consequently, they now are in a position to provide highly heat-resisting fibers free from breaking or powdering and a simple method for the manufacture of such fibers. According to an experiment conducted by the inventors, the ceramic fibers produced by using the raw material containing the phosphorus compound from the beginning are not observed to exhibit the highly heat-resisting property which is characteristic of the ceramic fibers of this invention.

The highly heat-resisting ceramic fibers of the present invention are applicable to general uses found for all ceramic fibers such as, for example, materials for ceramic furnaces, materials for foundries, highly refractory insulators, materials for household electric appliances and automotive parts. They are particularly suitable as furnace materials expected to endure and intercept intense heat. Now, typical working examples of the present invention will be described by way of illustration. The values of thermal contraction of fibers under load described hitherto and indicated in the following examples are those determined by following, the method proposed by Takei and Yoshida in the article titled "Method for determination of refractoriness of rock wool", appearing in the "Journal of Ceramics Society, 67 (2), 47 (1959)".

EXAMPLE 1

Figure 4:
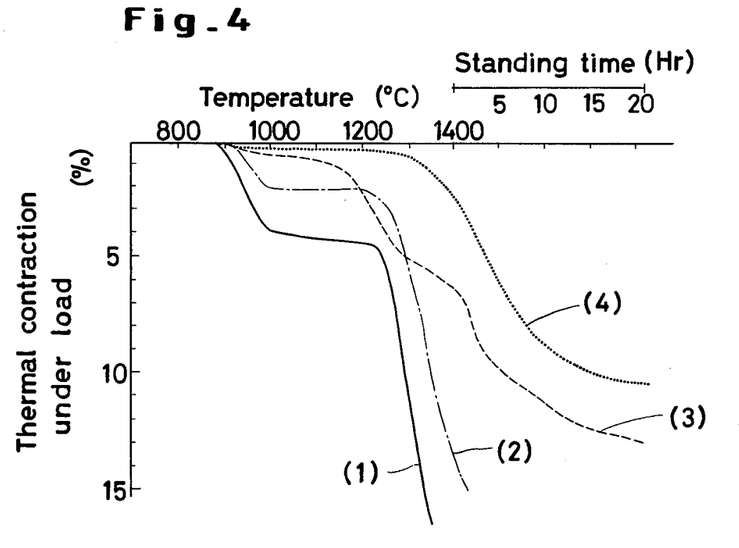
FIG. 4 is a graph showing the results of a test conducted on heat-resisting ceramic fibers of the present invention and similar ceramic fibers of the prior art as indicated in Example 1 to determine their thermal contraction under load.

In an aqueous solution containing diammonium hydrogen phosphate in a concentration of 4.24%, 100 gr. of ceramic fibers commercially available under the tradename "Ibi-Wool" ® (average silica content of 48.5% by weight, average alumina content of 51.5% by weight, 30 mm in average fiber length and 2μ in average fiber diameter) were immersed. The ceramic fibers were pulled out of the aqueous solution and, with the excess solution adhering to the surface of fibers removed by suction filtration, dried at a temperature falling in the range of from about 60° C. to 100° C. and thereafter heated to about 600° C. at a temperature increasing rate of 3° C./min. Thus were obtained highly heat-resisting ceramic fibers of the present invention. In the fibers, the phosphorus compound was found to be contained in a concentration of 2.08% by weight, computed as $P_2O_5$. The fibers were tested for thermal contraction under load. The results are shown by the curve (A) in FIG. 4. In the graph, the horizontal axis is graduated for temperature (°C.) and time of standing (hour) and the vertical axis for thermal contraction under load.

Then, the same commercially available ceramic fibers of tradename "Ibi-Wool" ®, high-alumina ceramic fibers commercially available under the tradename "Kao-Wool 1400" ® (silica content of 38.7% by weight and alumina content of 60.2% by weight) and silica-alumina-chromium three-component ceramic fibers commercially available under the tradename "Cera-Fiber Chrome" ® (silica content of 55.0% by weight, alumina content of 40.5% by weight and chromium oxide content of 4.0% by weight) were, in their untreated form, subjected to the same test for thermal contraction under load. The results are shown by the curves (1), (2) and (3) respectively in FIG. 4. It has been confirmed by the test that the highly heat-resisting ceramic fibers of the present invention showed practically no thermal contraction up to about 1300° C. and showed a slight contraction of 2% at a temperature of about 1400° C. and that the thermal contraction under load declined very little even after standing. These values except those obtained with ceramic fibers of all kinds known to the art to date.

EXAMPLE 2

By following the procedure of Example 1, the phosphorus compound was applied in varying amounts to the surface of the same "Ibi-Wool" ceramic fibers to produce highly heat-resisting ceramic fibers containing the phosphorus compound in varying concentrations of 0.23% by weight, 0.58% by weight, 2.05% by weight, 5.09% by weight and 9.95% by weight, respectively, computed as $P_2O_5$. These fibers were tested for thermal contraction under load. The results are shown by the curves (a), (b), (c), (d) and (e) respectively in FIG. 5.

Figure 5:
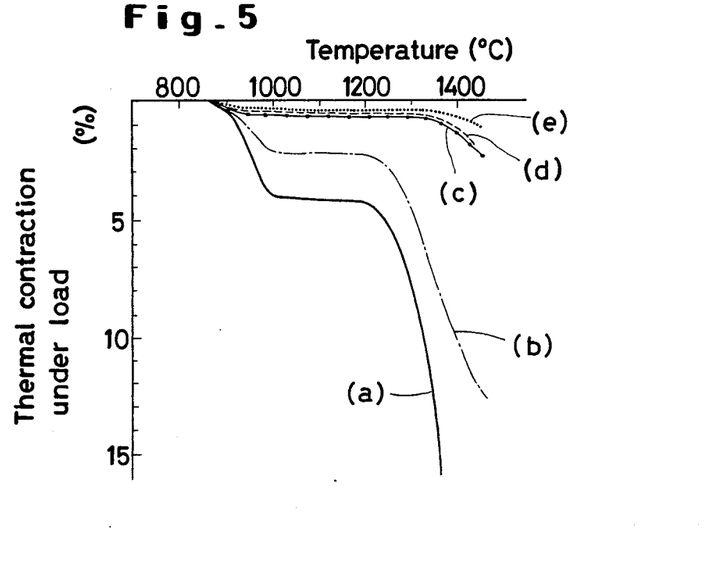
FIG. 5 is a graph showing the results of a test conducted on heat-resisting ceramic fibers of this invention and similar ceramic fibers not satisfying the conditions of this invention as indicated in Example 2 to determine their thermal contraction under load.

It is evident from the foregoing results that the ceramic fibers containing said phosphorus compound in a concentration of 0.23% by weight showed practically the same degree of thermal stability as conventional ceramic fibers and that the effect of the phosphorus compound in preventing fibers from thermal contraction appeared only in those ceramic fibers containing the compound in concentrations of 0.58% by weight and over. In the fibers containing the phosphorus compound in a concentration of 9.95% by weight, the flexibility or elasticity of the fibers was somewhat defective, although the effect of the phosphorus compound in the prevention of fibers from thermal contraction was amply conspicuous.

EXAMPLE 3

By following the procedure of Example 1, the phosphorus compound was caused to adhere to the surface of the same "Kao-Wool 1400" high-alumina ceramic fibers as used in Example 1 to produce highly heat-resisting ceramic fibers containing the phosphorus compound in a concentration of 2.31% by weight, computed as $P_2O_5$. The fibers were tested for thermal contraction under load. Conventional high-alumina ceramic fibers were, in their untreated form, subjected to the same test. The results are shown by the curves (1) and (2) respectively in FIG. 6.

Figure 6:
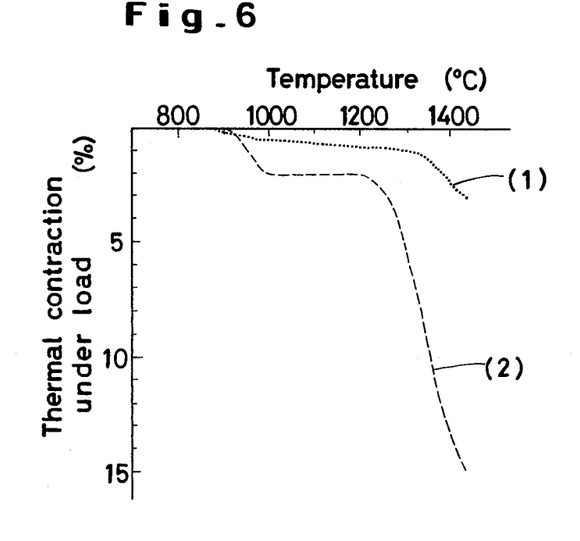
FIG. 6 is a graph showing the results of a test conducted on heat-resisting ceramic fibers of this invention and similar ceramic fibers of prior art as indicated in Example 3 to determine their thermal contraction under load.

It is evident from the foregoing results that while the conventional high-alumina ceramic fibers which gave the results of the curve (2) showed a thermal contraction of as high as about 15% at 1400° C., the high-aluminaceramic fibers of the present invention which gave the results of the curve (1) showed a thermal contraction of less than 2%. The comparison indicates that the ceramic fibers of the present invention enjoy a notable improvement in heat-resisting capacity.

EXAMPLE 4

By following the procedure of Example 1, the phosphorus compound was caused to adhere to the surface of the same "Cera-Fiber-Chrome" silica-alumina-chrome three-component ceramic fibers as used in Example 1 to produce highly heat-resisting ceramic fibers containing the phosphorus compound in a concentration of 1.81% by weight. These fibers were tested for thermal contraction under load. Conventional silica-alumina-chrome three-component ceramic fibers were, in their untreated form, subjected to the same test. The results are shown by the curves (1) and (2) respectively in FIG. 7.

Figure 7:
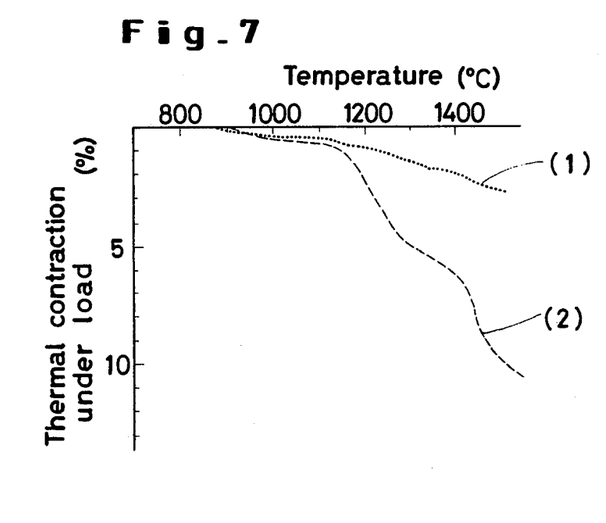
FIG. 7 is a graph showing the results of a test conducted on heat-resisting ceramic fibers of this invention and similar ceramic fibers of prior art as indicated in Example 4 to determine their thermal contraction under load.

It is evident from the foregoing results that, while the conventional three-component ceramic fibers suffered from serious secondary thermal contraction at a temperature of about 1200° C., the three-component ceramic fibers of the present invention which contained the phosphorus compound showed substantially no contraction up to about 1300° C. and showed a slight contraction of less than 2% even at a temperature of about 1400° C. The comparison clearly indicates that the ceramic fibers of the present invention enjoy a notable improvement in heat-resisting capacity.

EXAMPLE 5

Figure 8:
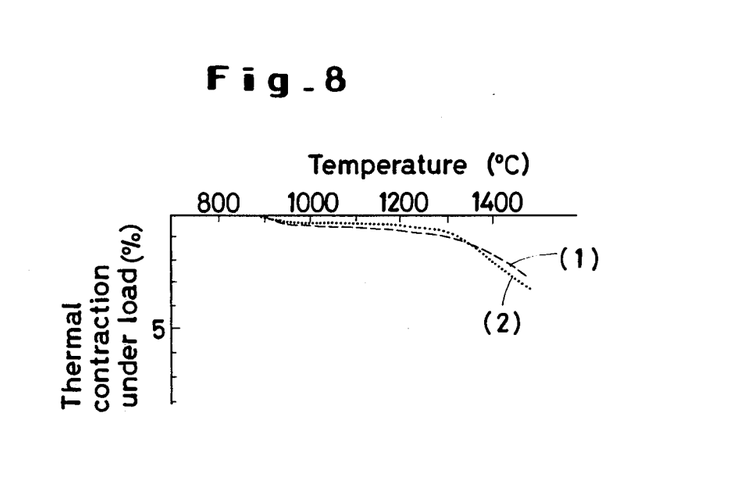
FIG. 8 is a graph showing the results of a test conducted on highly heat-resisting ceramic fibers of this invention as indicated in Example 5 to determine their thermal contraction under load.

In an aqueous solution containing diammonium hydrogen phosphate in a concentration of 4.24%, there was immersed 100 gr. of the same "Ibi-Wool" ceramic fibers as used in Example 1. The fibers were pulled out of the aqueous solution and, with the excessive solution adhering to the surface of fibers removed by suction filtration, dried at a temperature falling in the range of from 60° C. to 100° C. and, in their untreated form, subjected to thermal contraction test under load. The results are shown by the curve (1) of FIG. 8. The fibers were then given a heat treatment at 600° C. and then tested similarly for thermal contraction under load. The results are shown by the curve (2) of FIG. 8. The amount of the phosphorus compound adhering to the fibers after the step of drying and the amount of the phosphorus compound contained in the fibers after the step of heating were found to be 2.31% and 2.11% respectively, computed as $P_2O_5$. These two values are in substantial agreement and the thermal contraction under load was virtually the same between the two kinds of fibers. This clearly indicates that the ceramic fibers having the phosphorus compound kept in a state merely adhering to the surface of individual threads can acquire a highly heat-resisting capacity during their pass through the temperatures above 600° C.

EXAMPLE 6

By following the procedure of Example 5, the phosphorus compound was caused to adhere to the surface of the same "Ibi-Wool" ceramic fibers as used in Example 1. The resultant ceramic fibers were placed in an electric furnace and the temperature was increased at the rate of about 3° C./min. and heated therein up to 600° C. Thereafter, the fibers were tested for thermal contraction under load. The thermal contraction was 2.1% at a temperature of about 1400° C. This value of thermal contraction is practically the same as that obtained in Example 1. At this point, analysis of the fibers showed that the fibers contained the phosphorus compound in a concentration of 1.96% by weight.

EXAMPLE 7

A phosphorus compound was caused to adhere, in an amount corresponding to 4.3% by weight computed as $P_2O_5$, to the surface of a shaped article of ceramic fibers commercially available under the tradename "Ibi-Wool Sleeve" (having an $Al_2O_3$ content of 41.2% by weight of a $SiO_2$ content of 58.2% by weight). The shaped article was put to field test as a hot-top sleeve for aluminum alloy. The shaped sleeve using conventional ceramic fibers was generally usable in a total of seven to eight services. The sleeve made of the ceramic fibers of the present invention could be used in a total of ten to 15 services.

From the comparison, it is evident that highly heat-resisting ceramic fibers satisfying the standard of this invention are obtained by causing the phosphorus compound to adhere to the surface of the shaped ceramic fibers, immediately exposing the surfaces of the fibers to an elevated temperature and thereby heating the fibers gradually.

EXAMPLE 8

In aqueous solutions containing orthophosphoric acid in concentrations of 1.6, 3.2 and 6.4% by weight, the same "Ibi-Wool" ceramic fibers as used in Example 1 were soaked to have the phosphorus compound adhere to the surface of fibers by following the procedure of Example 1. Consequently, there were obtained highly heat-resisting ceramic fibers having the phosphorus compound in the respective concentration of 0.49% by weight, 1.1% by weight and 2.1% by weight, computed as $P_2O_5$. These fibers were tested respectively for thermal contraction under load. The results are shown by the curves (1), (2) and (3) of FIG. 9.

Figure 9:
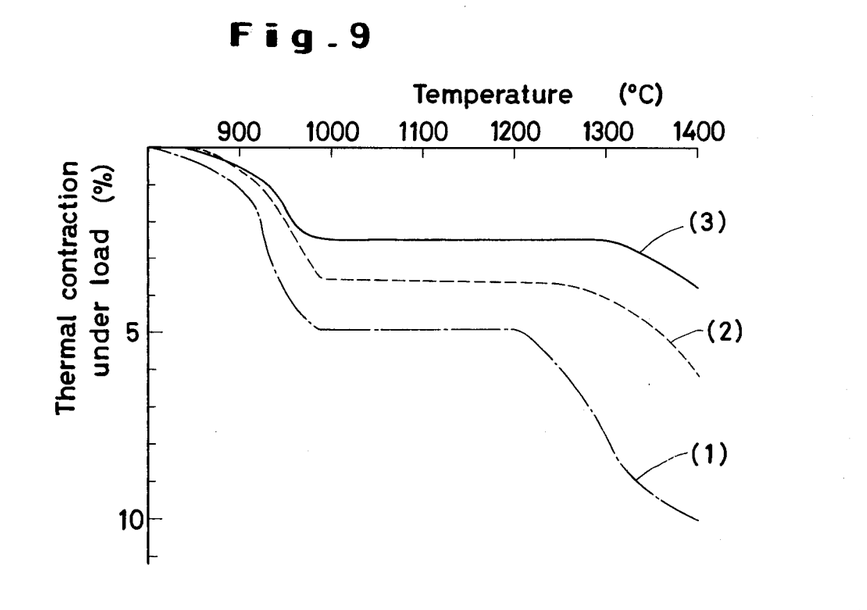
FIG. 9 is a graph showing the results of a test conducted on highly heat-resisting ceramic fibers of this invention as indicated in Example 8 to determine their thermal contraction under load.

From the results, it is evident that the fibers acquired sufficiently high heat-resisting capacity when they were treated with the solution of orthophosphoric acid and that the effect of the change of concentration showed the same tendency as when the treatment was given with the solution of diammonium hydrogen phosphate.

EXAMPLE 9

Figure 10:
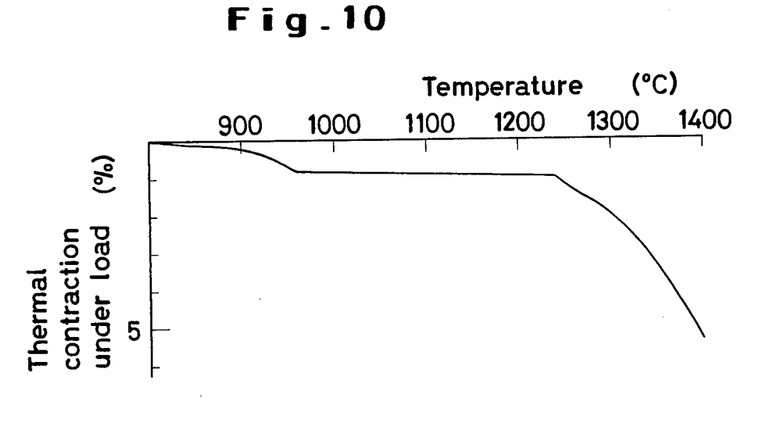
FIG. 10 is a graph showing the results of a test conducted on highly heat-resisting ceramic fibers of this invention as indicated in Example 9 to determine their thermal contraction under load.

By following the procedure of Example 1, the same "Ibi-Wool" ceramic fibers as used in Example 1 were soaked in an aqueous solution containing ammonium dihydrogen phosphate in a concentration of 7.4% by weight to have the phosphorus compound adhere to the surface of fibers. Consequently, there were obtained highly heat-resisting ceramic fibers having the phosphorus compound in a concentration of 2.2% by weight, computed as $P_2O_5$. These fibers were tested for thermal contraction under load. The results are shown in FIG. 10.

The results indicate that the thermal contraction began to occur in the neighborhood of 1300° C. and reached 5% at a temperature of about 1400° C. These values are virtually the same as those obtained of ceramic fibers using diammonium hydrogen phosphate.

EXAMPLE 10

Figure 11:
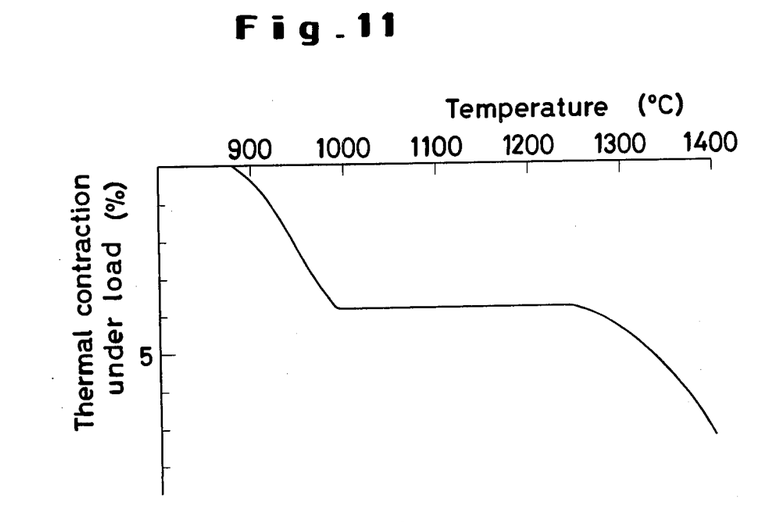
FIG. 11 is a graph showing the results of a test conducted on highly heat-resisting ceramic fibers of this invention as indicated in Example 10 to determine their thermal contraction under load.

By following the procedure of Example 1, the same "Ibi-Wool" ceramic fibers as used in Example 1 were soaked in a mixed aqueous solution containing 1% by weight of orthophosphoric acid and 2.33% of ammonium chloride to have the phosphorus compound adhere to the surface of fibers. Consequently, there were obtained highly heat-resisting ceramic fibers having the phosphorus compound in a concentration of 0.98% by weight, computed as $P_2O_5$. The fibers were tested for thermal contraction under load. The results are shown in FIG. 11.

It is seen from the results that the fibers showed a thermal contraction of 7% at 1400° C.

What is claimed is:

1. Highly heat-resistant fibers possessing a thermal contraction under load of not more than 10% at a temperature of 1400° C., comprising: ceramic fibers composed predominantly of silica and alumina each present in the fibers in an amount of at least 25% wt.% and a combined amount of at least 80 wt.% and containing very small precipitated crystals of cristobalite and/or mullite close to the surface of the individual fibers, said precipitated crystals formed by heat treatment of said fibers coated with a phosphorus compound such that from 0.5 to 10% by weight based on $P_2O_5$ of said phosphorus compound is incorporated into said ceramic fibers, the size and distribution of said precipitated crystals to the fibers being controlled by the introduction of the indicated quantity of said phosphorus compound into said fibers.

2. The heat-resistant fibers of claim 1, wherein the ceramic fibers are composed predominately of silica and alumina in respective amounts ranging from 30 to 50% and from 50 to 70%.

3. The heat-resistant fibers of claim 1, wherein the phosphorous compound is at least one member selected from one group consisting of orthophosphoric acid, pyrophosphoric acid, metaphosphoric acid, triphosphoric acid, tetraphosphoric acid, and $MH_2PO_4$, $M_2HPO_4$ and $M_3PO_4$ wherein M is selected from the group consisting of alkali metals and ammonium ion.

4. The heat-resistant fibers of claim 1, wherein the amount of said phosphorous compound incorporated into said ceramic fibers is within the range of 1 to 6% by weight computed as $P_2O_5$ and the thermal contraction under load of said fibers is not more than 5% by weight at a temperature of 1400° C.

5. Highly heat-resisting fibers possessing a thermal contraction under load of not more than 10% at a temperature of 1400° C., comprising: ceramic fibers composed predominately of silica and alumina each present in an amount of at least 25% by weight and in a combined amount of at least 80% by weight, and a phosphorous compound incorporated into the ceramic fibers in an amount of from 0.5 to 10% by weight computed as $P_2O_5$, said ceramic fibers having the phosphorus contained therein in such a way that the phosphorous concentration distribution gradually decreases from the surface to the core of each fiber.

6. The highly heat-resistant fibers of claim 5, wherein said ceramic fibers contain silica and alumina in respective amounts ranging from 30 to 50% and from 50 to 70% by weight.

7. The highly heat-resistant fibers of claim 5, wherein said phosphorous compound is at least one member selected from the group consisting of orthophosphoric acid, pyrophosphoric acid, metaphosphoric acid, triphosphoric acid, tetraphosphoric acid, and $MH_2PO_4$, $M_2HPO_4$, and $M_3PO_4$ wherein M is selected from the group consisting of alkali metals and ammonium ion.

8. The highly heat-resistant fibers of claim 5, wherein the amount of said phosphorous compound incorporated in said ceramic fibers is within the range of 1 to 6% by weight computed as $P_2O_5$ and the thermal contraction under load is not more than 5% by weight at a temperature of 1400° C.

9. Highly heat-resistant fibers possessing a thermal contraction under load of not more than 10% at a temperature of 1400° C., comprising:
ceramic fibers composed predominately of silica and alumina each present in the fibers in an amount of at least 25% by weight and a combined amount of at least 80% by weight, and a phosphorous compound incorporated into the ceramic fibers in an amount of from 0.5 to 10% by weight computed as $P_2O_5$, said ceramic fibers having a structure such that they are formed of crystals of a substantially uniform diameter of not more than 500 Å throughout the entire depth of each fiber from the surface to the core.

10. The heat-resistance fibers of claim 9, wherein said ceramic fibers are composed predominantly of silica and alumina in respective amounts of 30 to 50% and from 50 to 70% by weight.

11. The heat-resistant fibers of claim 9, wherein said phosphorous compound is at least one member selected from the group consisting of orthophosphoric acid, pyrophosphoric acid, metaphosphoric acid, triphosphoric acid, tetraphosphoric acid, and $MH_2PO_4$, $M_2HPO_4$ and $M_3PO_4$ wherein M is selected from the group consisting of alkali metals and ammonium ion.

12. The heat-resistant fibers of claim 9, wherein the amount of said phosphorous compound incorporated in the ceramic fibers ranges from 1 to 6% by weight computed as $P_2O_5$ and the thermal contraction under load is not more than 5% by weight at a temperature of 1400° C.

13. A method for preparing highly heat-resistant fibers possessing a thermal contraction under load of not more than 10% at a temperature of 1400° C., comprising:
coating the surface of ceramic fibers containing silica and alumina each in an amount of at least 25 wt.% with a phosphorous-containing compound such that said fibers are coated with from 0.5 to 10% by weight of said phosphorous-containing compound;
drying said coated fibers; and
heat-treating said coated fibers to a temperature of at least 600° C.

14. The method of claim 1, wherein said heat treatment is conducted at a temperature of at least 1000° C.

15. The method of claim 13, wherein the ceramic fibers are composed predominately of silica and alumina in a combined amount of at least 80% by weight.

16. The method of claim 13, wherein the ceramic fibers are composed predominately of silica and alumina in substantially equal amounts and in a combined amount of not less than 80% by weight.

17. The method of claim 13, wherein the ceramic fibers are composed predominately of silica and alumina in respective amounts ranging from 30 to 50% and from 50 to 70% by weight and in a combined amount of at least 80% by weight.

18. The method of claim 13, wherein the phosphorous compound is at least one member selected from the group consisting of orthophosphoric acid, pyrophosphoric acid, metaphosphoric acid, triphosphoric acid, tetraphosphoric acid, and $MH_2PO_4$, $M_2HPO_4$ and $M_3PO_4$ wherein M is selected from the group consisting of alkali metals and ammonium ion.

19. The method of claim 13, wherein the amount of the phosphorous compound incorporated into the ceramic fibers ranges from 0.5 to 10% by weight computed as $P_2O_5$ and the thermal contraction under load is not more than 10% at a temperature of 1400° C.

20. The method of claim 13, wherein the amount of the phosphorous compound incorporated into the ceramic fibers ranges from 1 to 6% by weight computed as $P_2O_5$ and the thermal contraction under load is not more than 5% by weight at a temperature of 1400° C.

* * * * *